US008205725B2

(12) United States Patent
Sakashita (10) Patent No.: US 8,205,725 B2
(45) Date of Patent: Jun. 26, 2012

(54) ELECTRIC DISK BRAKE (75) Inventor: Takayasu Sakashita, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 493 days.

(21) Appl. No.: 12/453,843

(22) Filed: May 26, 2009

(65) Prior Publication Data
US 2009/0294224 A1 Dec. 3, 2009

(30) Foreign Application Priority Data

May 30, 2008 (JP) ................................ 2008-142868

(51) Int. Cl.
*F16D 55/08* (2006.01)

(52) U.S. Cl. ......................... 188/72.8; 188/158; 188/162

(58) Field of Classification Search .................. 188/72.7, 188/72.8, 156, 157, 158, 161, 162, 72.1
See application file for complete search history.

(56) References Cited

U.S. PATENT DOCUMENTS

| | | | | |
|---|---|---|---|---|
| 6,098,763 A | * | 8/2000 | Holding | 188/158 |
| 6,705,435 B2 | * | 3/2004 | Severinsson | 188/158 |
| 6,837,342 B1 | * | 1/2005 | Olschewski et al. | 188/72.8 |
| 6,878,089 B2 | * | 4/2005 | Severinsson | 188/72.1 |
| 7,066,304 B2 | * | 6/2006 | Severinsson | 188/162 |
| 8,037,974 B2 | * | 10/2011 | Baumgartner | 188/72.8 |

FOREIGN PATENT DOCUMENTS

JP 2001-173691 A 6/2001

* cited by examiner

*Primary Examiner* — Thomas J Williams
(74) *Attorney, Agent, or Firm* — Rader, Fishman & Grauer PLLC (57) ABSTRACT

An electric disk brake includes a single electric motor, a pair of rotary-to-linear conversion mechanisms to which rotation of the electric motor is transferred, a pressing member that presses a brake pad toward a disk rotor by each of the rotary-to-linear conversion mechanisms and a reduction mechanism interposed between the electric motor and the pair of rotary-to-linear conversion mechanisms. The reduction mechanism transfers rotation output, where input of the electric motor is expanded, to one side of the pair of rotary-to-linear conversion mechanisms and transfers reaction force of the rotation output to the other side of the pair of rotary-to-linear conversion mechanisms.

17 Claims, 5 Drawing Sheets

ELECTRIC DISK BRAKE

BACKGROUND OF THE INVENTION

1. Field of the Invention

The present invention relates to an electric disk brake where a brake pad is pressed toward a disk rotor by means of an electric motor so as to generate braking force.

2. Description of the Related Art

In a generally known electric disk brake, rotary motion of a rotor of an electric motor is converted into linear motion for a piston by using a rotary-to-linear conversion mechanism such as a ball-screw mechanism or a ball-ramp mechanism, whereby two brake pads are pressed toward a disk rotor to generate braking force. In the electric disk brake, by detecting value of pedal efforts (or displacement) of a driver, etc. with a sensor, rotation of the electric motor is controlled with a control device based on the value detected so as to generate a given braking force.

In this kind of the electric disk brake as disclosed in, for example, Japanese Patent Application Laid-Open No. 2001-173691 (hereinafter referred to as the Patent Document 1), a reduction mechanism using a spur gear, etc. is interposed between a rotary-to-linear conversion mechanism and an electric motor. With this reduction mechanism, it is possible to reduce load applied to the electric motor contributing to downsizing as well as energy saving for the electric motor. Further, the Patent Document 1 discloses art where a pair of rotary-to-linear conversion mechanisms is driven with a single electric motor.

However, in the conventional electric disk brake using the reduction mechanism as discussed hereinabove, there has been a problem that the reduction mechanism needs to be large in its size in case a speed reducing ratio is enlarged. Further, if the electric disk brake is used with the pair of rotary-to-linear conversion mechanisms, output expansion cannot be achieved.

SUMMARY OF THE INVENTION

The present invention has been made in light of the above problem, and it is an object of the present invention to provide an electric disk brake which is small but able to obtain large force for pressing the brake pads.

In order to achieve the object described above, according to a first aspect of the present invention, there is provided an electric disk brake comprising: a single electric motor; a pair of rotary-to-linear conversion mechanisms to which rotation of the electric motor is transferred; a pair of pressing member that presses at least one brake pad toward a disk rotor by means of each of the rotary-to-linear conversion mechanisms; and a reduction mechanism arranged between the electric motor and the pair of rotary-to-linear conversion mechanisms, wherein the reduction mechanism transfers a rotary output, where input of the electric motor is enlarged, to one side of the pair of rotary-to-linear conversion mechanisms, and transfers reaction force of the rotary output to the other side of the pair of rotary-to-linear conversion mechanisms.

According to a second aspect of the present invention, there is provided an electric disk brake comprising: a single electric motor; a pair of rotary-to-linear conversion mechanisms to which rotation of the electric motor is transferred; a pressing member that presses at least one brake pad toward a disk rotor by means of each of the rotary-to-linear conversion mechanisms; and a reduction mechanism arranged between the electric motor and the pair of rotary-to-linear conversion mechanisms, wherein the reduction mechanism comprises: an input portion that receives a rotary input from the electric motor; a first output portion that outputs a rotary output where the rotary input of the input portion is increased; and a second output portion that outputs reaction force of difference between the rotary output of the first output portion and the rotary input of the input portion, the first output portion and the second output portion being connected to each of the pair of rotary-to-linear conversion mechanisms.

According to a third aspect of the present invention, there is provided an electric disk brake comprising: a single electric motor; a pair of rotary-to-linear conversion mechanisms to which rotation of the electric motor is transferred; a pressing member that presses at least one brake pad toward a disk rotor by means of each of the rotary-to-linear conversion mechanisms; and a reduction mechanism arranged between the electric motor and the pair of rotary-to-linear conversion mechanisms, wherein the reduction mechanism comprises: an eccentric shaft that is eccentrically rotated by means of rotation of the electric motor; an external gear that is rotatably supported with the eccentric shaft; and a first internal gear and a second internal gear that each perform differential rotation by engaging with the external gear, the first and second internal gears each transferring their rotation to the pair of rotary-to-linear conversion mechanisms.

Based on the electric disk brake according to the present invention, by means of the reduction mechanism, a rotary output, where input of the electric motor is expanded, is transferred to one side of the pair of rotary-to-linear conversion mechanisms while reaction force of the rotary output is transferred to the other side of the pair of rotary-to-linear conversion mechanisms. With this architecture, the pair of the rotary-to-linear conversion mechanisms is driven thereby being able to obtain large thrust force.

DETAILED DESCRIPTION OF THE PREFERRED EMBODIMENTS

Figure 1:
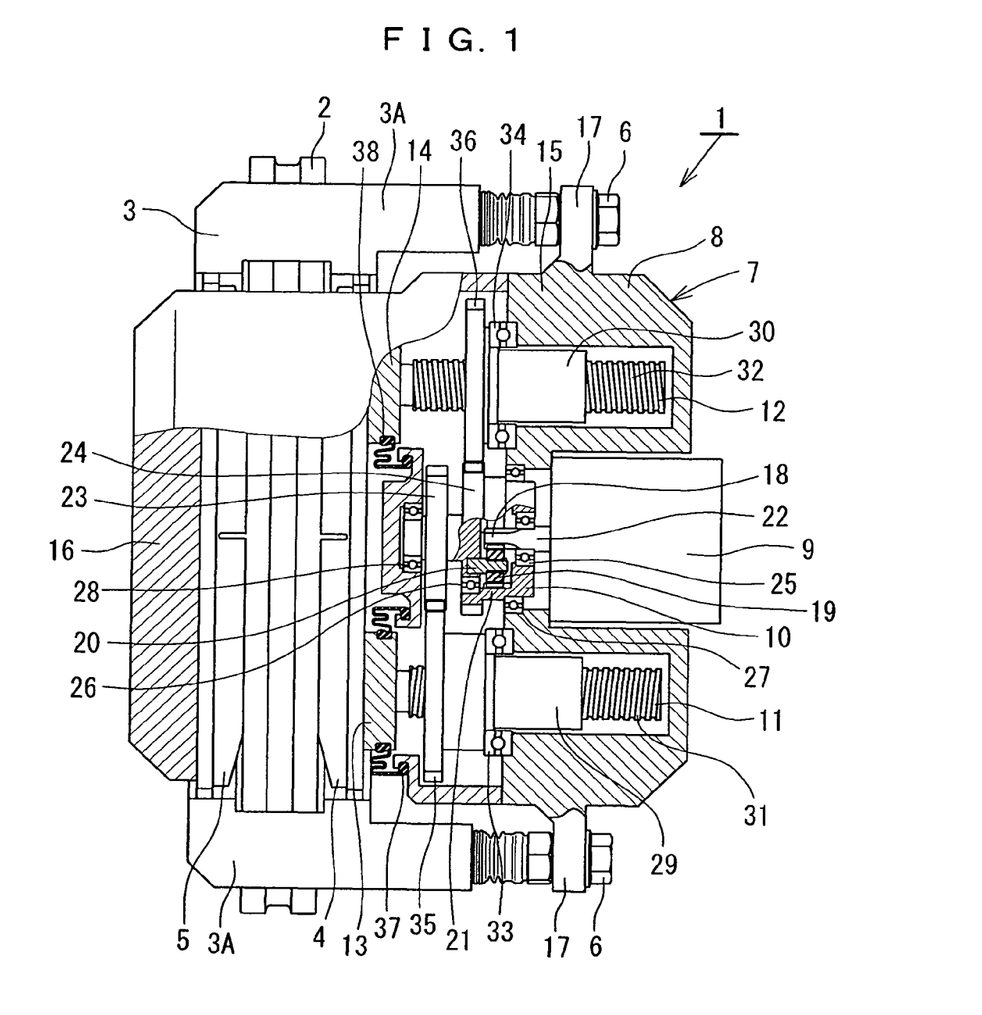
FIG. 1 is a longitudinal section of an electric disk brake according to a first embodiment of the present invention.

Embodiments of the present invention will be described with reference to the accompanying drawings. First, a first embodiment of the present invention will be described with reference to FIGS. 1 and 2. As shown in FIG. 1, an electric disk brake 1 of this embodiment is categorized into a floating caliper disk brake and comprises: a disk rotor 2 being rotated along with wheels; a carrier 3 fixed to a non-rotating part (not shown) on a vehicle body side, for example, suspension member, etc.; a pair of brake pads 4, 5 arranged on both sides of the disk rotor 2 and supported by the carrier 3; and an electric caliper 7 arranged so as to sandwich the disk rotor 2 and supported by a pair of arm portions 3A, 3A of the carrier 3 by means of a pair of slide pins 6, 6, the electric caliper 7 being movable along the disk rotor 2 in its axial direction.

The electric caliper 7 includes the following constituents: a motor/control unit 9 (electric motor); a reduction mechanism 10; a pair of ball screw mechanisms 11, 12 (rotary-to-linear conversion mechanisms); and a pair of pistons 13, 14 (pressing members), these constituents being installed into a caliper main body 8. The caliper main body 8 is structured as that a main body portion 15, a claw portion 16 and a pair of boss portions 17, 17 are integrally formed. The claw portion 16 is extended from the main body portion 15 to the opposite side thereof so as to sandwich the disk rotor 2, the claw portion 16 being faced with the brake pad 5. The pair of boss portions 17, 17 is extended from the main body portion 15 so as to project in a rotational direction of the disk rotor 2, the boss portions 17, 17 being adapted to connect with the pair of the slide pins 6, 6. The motor/control unit 9 and the reduction mechanism 10 are arranged at the center portion of the main body portion 15. On both sides of the motor/control unit 9 and the reduction mechanism 10 in a rotational direction of the disk rotor 2, the pair of the ball screw mechanisms 11, 12 is arranged along the disk rotor 2 in its circumferential direction.

Figure 2:
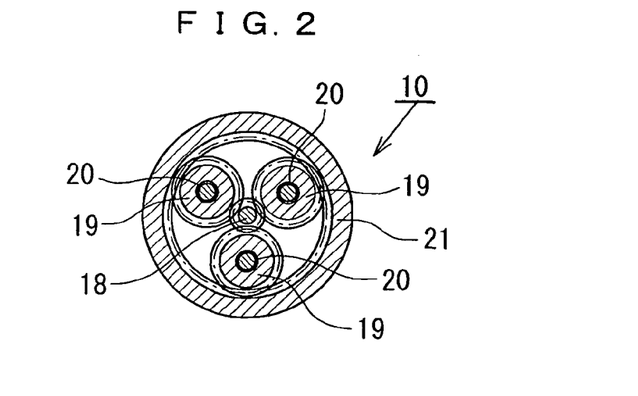
FIG. 2 is a longitudinal section of a reduction mechanism of the electric disk brake of FIG. 1.

The reduction mechanism 10 is categorized into a planetary gear mechanism, which comprises: a sun gear 18 at its center (input portion); three pieces of planetary pinions 19, 19, 19 engaged around the sun gear 18; planetary carriers 20, 20, 20 (first output portions) supporting these planetary pinions 19, 19, 19; and a ring gear 21 (a second output portion) engaged around the planetary pinions 19, 19, 19. The sun gear 18 (an input gear) is integrally formed with an output shaft 22 of the motor/control unit 9. Each of the planetary carriers 20, 20, 20 is connected with a first output gear 23 (spur gear). The ring gear 21 is connected with a second output gear 24 (spur gear). The output shaft 22, the first output gear 23 and the second output gear 24 are arranged in a concentric manner. The output shaft 22 and the ring gear 21 are each rotatably supported by means of a bearing 25. Further, the ring gear 21 and the planetary carriers 20, 20, 20 are each rotatably supported by means of a bearing 26. Moreover, the ring gear 21 and the second output gear 24 are rotatably supported in the caliper main body 8 by means of a bearing 27. The planetary carriers 20, 20, 20 and the first output gear 23 are rotatably supported in the caliper main body 8 by means of a bearing 28.

Each of the ball screw mechanisms 11, 12 comprises: nuts 29, 30; screw shafts 31, 32 inserted into the nuts 29, 30; and a plurality of balls (not shown) installed between the nuts 29, 30 and ball grooves of the screw shafts 31, 32. In each of the pair of ball screw mechanisms 11, 12, by relatively rotating between the nuts 29, 30 and the screw shafts 31, 32, the nuts 29, 30 and the screw shafts 31, 32 are relatively moved in its axial direction. The nuts 29, 30 are rotatably supported in the caliper main body 8 by means of thrust bearings 33, 34. To each of the nuts 29, 30, spur gears 35, 36 are integrally installed. The spur gears 35, 36 are each engaged with the first and second output gears 23, 24 of the reduction mechanism 10. Each ball groove of the ball screw mechanisms 11, 12 is structured to be reverse to each other. Accordingly, in case that the first and second output gears 23, 24 are each rotated in a reverse direction to each other, the screw shafts 11, 12 are adapted to move in the same direction.

Numbers of teeth with respect to the sun gear 18, the planetary pinions 19, 19, 19 and the ring gears 21 of the reduction mechanism 10 are properly set in order to obtain a given speed reducing ratio. Further, in order to equalize rotational angles of the nuts 29, 30 of the ball screw mechanisms 11, 12 and to equalize thrust force of the ball screw mechanisms 11, 12 to each other, numbers of teeth with respect to the first and second output gears 23, 24 and the spur gears 35, 36 of the ball screw mechanisms 11, 12, as output adjusting means, are also properly set.

Tip portions of the screw shafts 31, 32 of the ball screw mechanisms 11, 12 are installed into the pistons 13, 14 in a condition where these tip portions are not rotated relative to the pistons 13, 14. The screw shafts 31, 32 are adapted to press one of the brake pad 4 toward the disk rotor 2 through the pistons 13, 14. The pistons 13, 14 are prohibited from being rotated relative to the brake pad 4 by means of a whirl-stop means such as pins. Further, dust seals 37, 38 will seal space between the pistons 13, 14 and the caliper main body 8.

In the motor/control unit 9, the electric motor, a rotational position detecting means that detects a rotational position of the output shaft 22, and a drive control circuit that controls drive of the electric motor are integrally installed.

Effect achieved by the embodiment of the present invention discussed above will be next explained. In braking, according to a brake operation of a driver, etc., control current is supplied from a vehicle controller (not shown) to the motor/control unit 9, whereby the output shaft 22 of the electric motor is rotated with given torque at a predetermined angle according to the brake operation. By the rotation of the output shaft 22 (sun gear 18), the first output gear 23 (the planetary carrier 20) and the second output gear 24 (ring gear 21) of the reduction mechanism 10 are decelerated in a predetermined speed reducing ratio, performing a differential rotation, whereby the spur gears 35, 36 of the ball screw mechanisms 11, 12 are rotated. At this time, the first output gear 23 and the second output gear 24 are each adapted to rotate in a revere direction. Here, since the screw shafts 31, 32 of the ball screw mechanisms 11, 12 each have reversely formed grooves, the screw shafts 31, 32 are both moved in an advance direction whereby the pistons 13, 14 are adapted to press one of the brake pad 4 to the disk rotor 2. By means of reaction force caused by pressure of the pistons 13, 14, the caliper main body 8 is moved along the slide pin 6, and the claw portion 16 will press the other side of the brake pad 5 toward the disk rotor 2. With this architecture, braking force is generated by pressing the brake pads 4, 5 toward the disk rotor 2. In case that brake force is released, the output shaft 22 of the motor/control unit 9 is rotated in a reverse direction so as to make the pistons 13, 14 moved backward, whereby the brake pads 4, 5 are separated from the disk rotor 2.

A vehicle controller will apply a variety of sensors. With the vehicle controller, a vehicle condition, which is identifiable by a rotational speed of each wheel, a vehicle speed, vehicle acceleration, a steering angle, vehicle lateral acceleration, and the like, can be detected. Based on these detections, rotation of the output shaft 22 of the motor/control unit 9 can be controlled, whereby a servo control, an anti-lock control, a traction control, a vehicle stabilizing control, and the like can be performed.

In the reduction mechanism 10, the planetary gear mechanism includes three basic shafts wherein one of the three basic shafts is used as an input shaft (input portion) while two remaining basic shafts performing differential rotation are used as output shafts (output portions). One of the output shafts will increase its torque in a predetermined speed reducing ratio while its reaction force will be output to the other output shaft. Accordingly, compared to a case where one of the output shafts is fixed, it is possible to make output approximately double when the electric motor is rotated at a high speed. With this architecture, load of the electric motor can be also reduced, contributing to downsizing and energy saving.

According to the patent document 1, if one of the rotary-to-linear conversion mechanisms is broken down and not functioned, the reduction mechanism itself will be not functioned. To the contrary, in the case of the present invention, since the pair of output shafts performs differential rotation, even if one of the ball screw mechanisms 11, 12 is broken down and not functioned, the other can be driven thereby being able to generate breaking force. With this architecture, it is possible to provide the electric disk brake wherein, even if one of the rotary-to-linear conversion mechanisms is broken down and not functioned, the other can continue to function in a well-stabilized manner.

In the present embodiment, relative to rotation of the output shaft 22, rotation angles of the nuts 29, 30 of the ball screw mechanisms 11, 12 are set to be identical. However, by modifying the following setting: numbers of teeth of each gear in the reduction mechanism 10; numbers of teeth of spur gears 35, 36; and lead of the ball grooves of the ball screw mechanisms 11, 12, it is possible to modify distribution of pressuring force of the pistons 13, 14. Accordingly, pressure patterns of the brake pad 4 can be controlled.

Here, in the embodiment discussed hereinabove, the ball screw mechanisms 11, 12 are used as the rotary-to-linear conversion mechanisms; however, the other conventional ball screw mechanisms such as slide screw mechanisms or roller screw mechanisms may be applied.

Next a second embodiment of the present invention will be discussed with reference to FIGS. 3 and 4. Here, any components identical with or corresponding to those of the aforementioned first embodiment are denoted by the same reference numerals, and a detailed description thereof will be omitted below.

Figure 3:
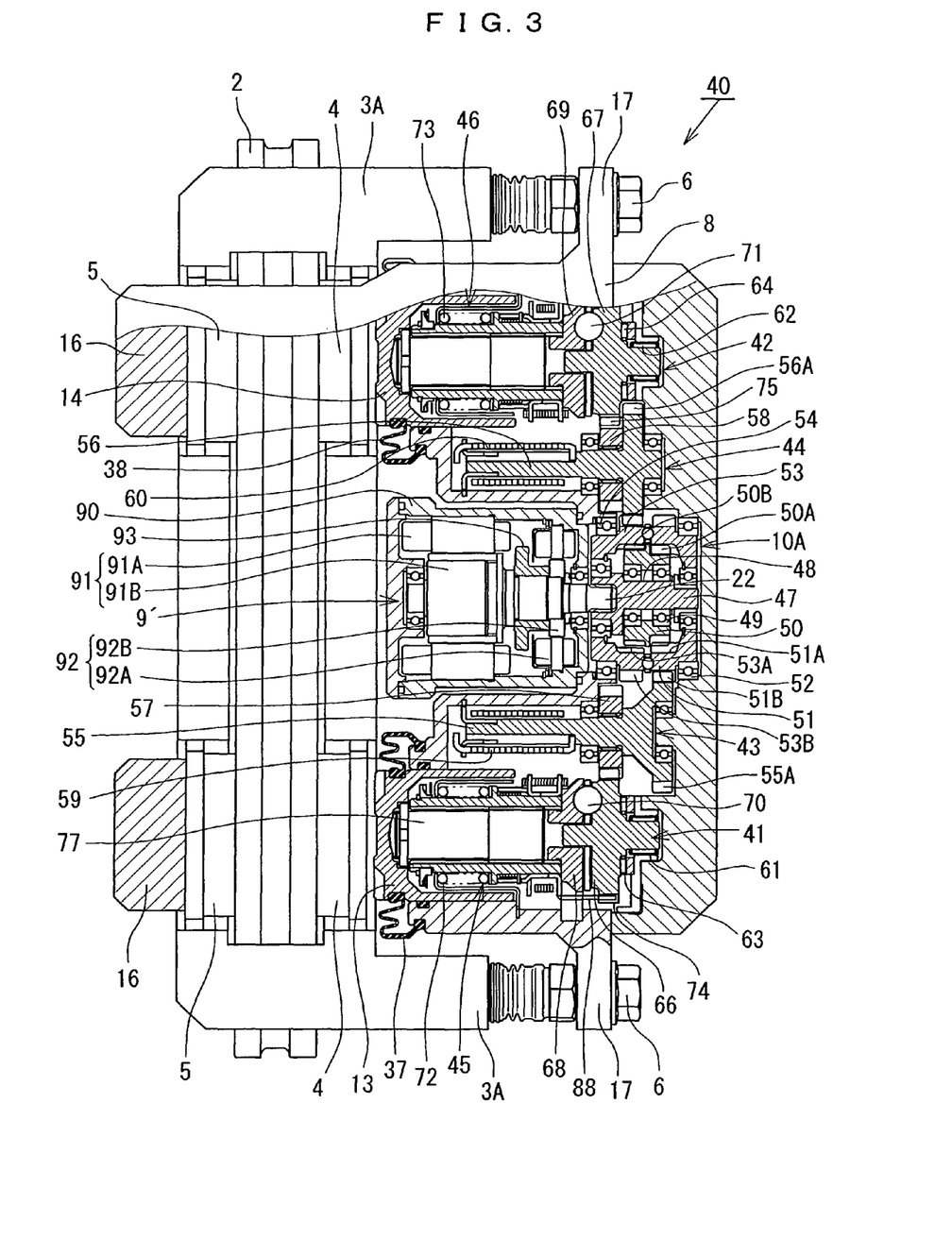
FIG. 3 is a longitudinal section of an electric disk brake according to a second embodiment of the present invention.
Figure 4:
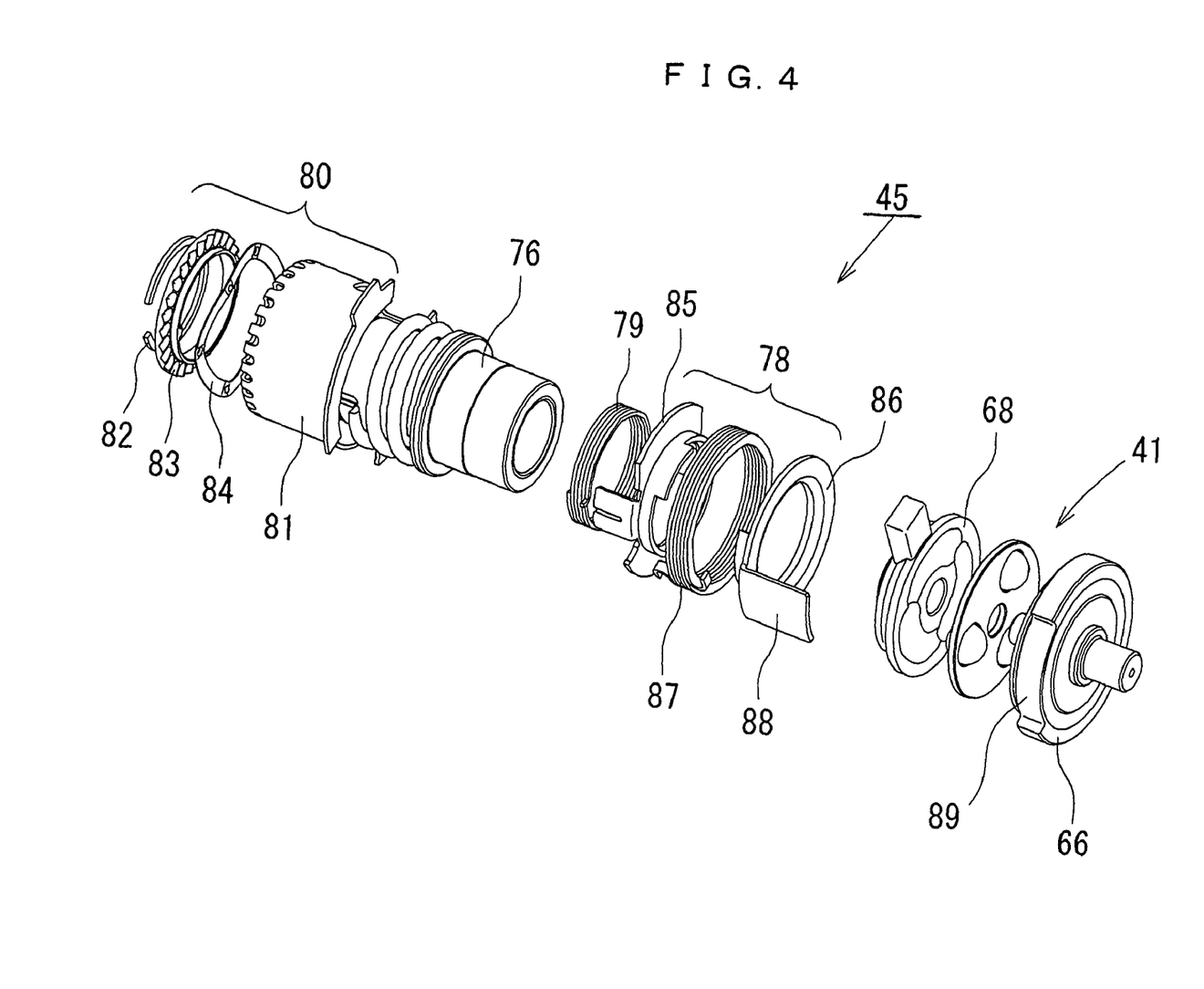
FIG. 4 is an exploded perspective view of a pad wear follow-up mechanism of the electric disk brake of FIG. 3.

As shown in FIG. 3, an electric disk brake 40 of the second embodiment is, in addition to the first embodiment, provided with a differential deceleration mechanism 10A as the reduction mechanism. Further, as the rotary-to-linear conversion mechanism, a pair of ball-ramp mechanisms 41, 42 is provided. Still further, return mechanisms 43, 44 that make the ball-ramp mechanisms 41, 42 returned to an initial position, and pad wear follow-up mechanisms 45, 46 that compensate for wear of the brake pads 4, 5 are also provided in the electric disk brake 40.

At the center portion of the main body portion 15 of the caliper main body 8, the motor/control unit 9 and the differential deceleration mechanism 10A are provided. On both sides of the motor/control unit 9 and the differential deceleration mechanism 10A, the pair of return mechanisms 43, 44 is provided. Further, on each side of the pair of return mechanisms 43, 44, the ball-ramp mechanisms 41, 42 are provided. The pad wear follow-up mechanisms 45, 46 are interposed between the ball-ramp mechanisms 41, 42 and the pistons 13, 14.

The differential deceleration mechanism 10A comprises: an eccentric shaft 47; a circular external gear 50; a first ring gear 51 (a first internal gear); and a second ring gear 53 (a second internal gear). The eccentric shaft 47 is spline-connected with the output shaft 22 of the motor/control unit 9. The external gear 50 includes two rows of external teeth 50A, 50B, numbers of teeth of which are each different, rotatably supported in an eccentric portion 48 of the eccentric shaft 47 by means of a bearing 49. The first ring gear 51 has an internal tooth 51A for engaging with the external tooth 50A of the external gear 50 and rotatably supported in the caliper main body 8 by means of a bearing 52. The second ring gear 53 (the second internal gear) has an internal tooth 53A for engaging with the external tooth 50B of the external gear 50 and supported in the caliper main body 8 by means of a bearing 54.

The first ring gear 51 is provided with an external tooth 51B while the second ring gear 53 is provided with an external tooth 53B. By rotating the eccentric shaft 47 so as to revolve external gear 50, the first ring gear 51 engaging with the external tooth 50A and the second ring gear 53 engaging with the external tooth 50B are adapted to perform differential rotation each in a different direction in a predetermined speed reducing ratio.

In the return mechanisms 43, 44, return shafts 55, 56 are rotatably supported in the caliper main body 8. Here, the return shafts 55, 56 are integrally structured as that spur gears 55A, 56a are each engaged with the external teeth 51B, 52B of the first and second ring gears 51, 52 of the reduction mechanism 10A. At the return shafts 55, 56, the spur gears 57, 58 are rotatably provided. Between the return shafts 55, 56 and the caliper main body 8, return springs 59, 60 (coil spring) are connected. These return springs 59, 60 normally urge the return shafts 55, 56 with their spring force to an initial position in a predetermined set torque.

The ball-ramp mechanisms 41, 42 comprises rotation disks 66, 67, linear-motion disks 68, 69 and balls 70, 71 (rolling element). The rotation disks 66, 67 are rotatably supported in the caliper main body 8 by means of bearings 61, 62 as well as thrust bearings 63, 64. The linear-motion disks 68, 69 are faced to the rotation disks 66, 67, the linear-motion disks 68, 69 being fixed in a rotational direction but movable in an axial direction. The balls 70, 71 are interposed between the ball grooves (beveled grooves) formed on opposed surfaces between the linear-motion disks 68, 69 and the rotational disks 66, 67. The linear-motion disks 68, 69 are normally urged toward the rotation disks 66, 67 by means of springs 72, 73. The rotation disks 66, 67 are provided with external teeth 74, 75 for engaging with the spur gears 57, 58 of the return mechanisms 43, 44. By rotating the rotation disks 66, 67, the balls 70, 71 are rolled between the ball grooves in a bevel formation, whereby the linear-motion disks 68, 69 are moved in its axial direction according to a rotation angle of the rotation disks 66, 67. Here, in the ball-ramp mechanisms 41, 42, the ball grooves are beveled in a reverse direction to each other, whereby the linear-motion disks 68, 69 are adapted to move in the same direction by rotating the rotation disks 66, 67 in a reverse direction to each other.

Next, the pad wear follow-up mechanisms 45, 46 will be explained with reference to FIG. 4. Here, since both the pad wear follow-up mechanism 45 and the pad wear follow-up mechanism 46 are structured as the same, the explanation will be given only to the former.

The pad wear follow-up mechanism 45 comprises: an adjusting nut 76; an adjusting screw 77 (see FIG. 3); a limiter mechanism 78, a one-way clutch spring 79, and a retention mechanism 80. The adjusting nut 76 and the adjusting screw 77 are interposed between the linear-motion disk 68 of the ball-ramp mechanism 41 and the piston 13 so as to be screwed to each other. The limiter mechanism 78 and the one-way clutch spring 79 are adapted to transfer rotation of the rotation disk 66 to the adjusting nut 76. The retention mechanism 80 is structured as providing certain resistance to rotation of the adjusting nut 76. The adjusting nut 76 is rotatable to the linear-motion disk 68 while the adjusting screw 77 is prohibited from being rotated to the piston 13.

The retention mechanism 80 comprises: a cup member 81; a resistance member 83; and a wave washer 84. The cup member 81 is fixed to the caliper main body 8 side, and the adjusting nut 76 is inserted thereinto. The resistance member 83 is formed into a ring shape and fixed to an outer circumference of the end portion of the adjusting nut 76 by means of a retainer 82, the resistance member being faced to the end portion of the cup member 81. The wave washer 84 is interposed between an end surface of the cup member 81 and the resistance member 83. Each opposed surface of the cup member 81 and the resistance member 83 has convexoconcave formation. By engaging the convexoconcave of the cup member 81 and the convexoconcave of the resistance member 83 with the wave washer 84 sandwiched therebetween, the adjusting nut 76 is retained to the cup member 81 with certain resistive force, the adjusting nut 76 not being rotated. The adjusting nut 76 can be rotated by applying rotational force which overpasses the above resistive force.

The limiter mechanism 78 is structured as that ring members 85, 86 are connected to each other by means of a coil torsion spring 87. The ring members 85, 86 are engaged with each other as that both ring members are allowed to be relatively rotated in a certain level; however, by elastic force of the torsion spring 87, a predetermined set load is provided to the relative rotation of the ring members 85, 86. The adjusting nut 76 is then inserted into the limiter mechanism 78. A lever 88 extended from an outer circumference of the ring member 86 in its axial direction is inserted into a cutout 89 formed at an outer circumference of the rotation disk 66 of the ball-ramp mechanism 41, the lever 88 having a certain play in a circumferential direction. With this architecture, when the rotation disk 66 is rotated over a certain limit, the over-limit rotation is transferred to the ring member 86 through the lever 88.

The one-way clutch spring 79 is a coil spring member wound around the adjusting nut 76. One end of the one-way clutch spring 79 is connected to the ring member 85 of the limiter mechanism 78. For one-directional rotation of the ring member 85 relative to the adjusting nut 76 (rotation that the adjusting screw 77 is advanced to the brake pad 4 side according to rotation of the adjusting nut 76), the one-way clutch spring 79 reduces its diameter so as to transfer its rotation to the adjusting nut 76. Further, for another-directional rotation of the ring member 85 relative to the adjusting nut 76, the one-way clutch spring 79 expands its diameter for drag so as not to transfer its rotation to the adjusting nut 76.

In a motor unit 9', as shown in FIG. 3, an electric motor 91, a resolver 92, and a parking brake gear 93 are integrally mounted. The electric motor 91 comprises a stator 91A and a rotor 91B, both being arranged within a motor case 90. The resolver 92 comprises a resolver stator 92A and a resolver rotor 92B, the resolver 92 detecting rotational position of the rotor 91B of the electric motor 91. The parking brake gear 93 is fixed to the rotor 91B so as to be rotatable along with the rotor 91B. By engaging or non-engaging the parking brake gear 93 by means of an engaging means not shown, the rotor 91B can be mechanically locked or unlocked.

Effects achieved by the second embodiment of the present invention discussed above will be next explained. In braking, according to a brake operation of a driver, etc., control current is supplied from a vehicle controller (not shown) to the motor unit 9', whereby the rotor 91B of the electric motor 91 (that is, the output shaft 22) is rotated with given torque at a predetermined angle. By the rotation of the output shaft 22, the eccentric shaft 47 is rotated whereby the external gear 50 is revolved according to eccentric rotation of the eccentric portion 48. Thus, the first ring gear 51 and the second ring gear 53 engaged with the external teeth 50A, 50B of the external gear 50 perform differential rotation in a predetermined speed reducing ratio.

By rotation of the first and second ring gears 51, 53, the return shafts 55, 56 provided with the external teeth 55A, 56A that are engaged with the external teeth 51B, 53B will rotate against spring force of the return springs 59, 60. Further, the rotation disks 66, 67 of the ball-ramp mechanisms 41, 42 being provided with the external teeth 74, 75 engaged with the spur gears 57, 58 installed at the return shafts 55, 56 will be rotated.

By rotation of the rotation disks 66, 67, the balls 70, 71 are rolled within the ball grooves, whereby the linear-motion disk 68, 69 are advanced so as to make the pistons 13, 14 moved forward through the pad wear follow-up mechanisms 45, 46. By the advancement of the pistons 13, 14, the brake pad 4 is pressed toward the disk rotor 2. Through the reaction force, the caliper main body 8 is moved along the slide pin 6 whereby the brake pad 5 is pressed toward the disk rotor 2 by means of the claw portion 16. With this architecture, the brake pads 4, 5 are pressed toward the disk rotor 2 so as to generate braking force.

When braking force is released, the output shaft 22 (the rotor 91B) of the motor unit 9' is reversely rotated so as to make the pistons 13, 14 moved backward, whereby the brake pads 4, 5 are separated from the disk rotor 2. Here, since the rotor disks 66, 67 of the ball-ramp mechanisms 41, 42 are returned to an initial position by means of the return springs 59, 60 of the return mechanisms 43, 44, positional displacement of the rotor disks 66, 67 caused based on differential rotation of the first ring gear 51 and the second ring gear 53 of the differential deceleration mechanism 10A can be rectified.

Next, operations of the pad wear follow-up mechanisms 45, 46 will be explained. Since the pad wear follow-up mechanisms 45, 46 are both structured as the same, only the pad wear follow-up mechanism 45 will be explained hereinbelow.

In case that the brake pads 4, 5 are not impaired with wear, the rotation disk 66 of the ball-ramp mechanism 41 can rotate within play defined by the cutout 89 and the lever 88 of the limiter mechanism 78. At this time, since rotation of the rotation disk 66 is not transferred to the adjusting nut 76, the pad wear follow-up mechanism 45 will not be subject to wear compensation.

On the other hand, in case that the brake pads 4, 5 are impaired with wear, and the piston 13 cannot press the brake pad 4 even if the rotation disk 66 rotates beyond the play of the lever 88 of the limiter mechanism 78, rotation of the disk 66 is first transferred to the limiter mechanism 78 through the lever 88. The rotation of the limiter mechanism 78 is transferred to the adjusting nut 76 through the one-way clutch spring 79, whereby the adjusting nut 76 is rotated against resistive force of the retention mechanism 80. With the rotation of the adjusting nut 76, the adjusting screw 77 is advanced so as to lessen a pad clearance. Here, when the brake pads 4, 5 start to press the disk rotor 2, its reaction force will increase frictional force between the adjusting nut 76 and the screw portion of the adjusting screw 77, whereby rotation of the adjusting nut 76 will be locked so as to complete adjustment of the pad clearance. After completion of the adjustment, the rotation disk 66 is allowed for rotation by bending the torsion spring 87 of the limiter mechanism 78. When braking force is released, the adjusting nut 76 does not rotate due to drag of the one-way clutch spring 79, whereby the piston 13 will be moved backward by an amount where the linear-motion disk 68 of the ball-ramp mechanism 41 recedes. With this architecture, it is possible to rotate the adjusting nut 76 to advance the piston 13 by an amount where the brake pads 4, 5 are worn. Accordingly, the pad clearance can be always kept in constant, whereby wear of the brake pads 4, 5 can be compensated.

Since the pad wear follow-up mechanisms 45, 46 are provided, the ball-ramp mechanisms 41, 42 only need to have minimum strokes, whereby bevel (lead) of the ball grooves can be minimized contributing to expansion of thrust force.

Further, an amount where the return mechanisms 43, 44 are returned can be also minimized, whereby the return springs 59, 60 can be miniaturized.

In the differential deceleration mechanism 10A, as the same with the first embodiment discussed hereinabove, one of three basic shafts of a planetary gear mechanism is applied as an input shaft (the eccentric shaft 47), and the other two basic shafts performing differential rotation are applied as output shafts (the first and second ring gears 51, 53). With this architecture, it is possible to obtain a large speed reducing ratio and to obtain approximately double output when the electric motor is rotated at a high speed, compared to a case where one of the output shafts is fixed. Accordingly, load on the electric motor 91 can be reduced, contributing to energy saving and downsizing.

Further, since two output shafts perform differential rotation, if one of the ball-ramp mechanisms 41, 42 is broken down and not functioned, the other can be driven so as to be able to generate braking force. Accordingly, even if one of the rotary-to-linear conversion mechanisms is broken down and not functioned, the other can be continued to operate whereby a stably operable electric disk brake is providable.

In the second embodiment, it is possible to set the return springs 59, 60 of the return mechanisms 43, 44 to have different spring force to each other, whereby either the piston 13 or the piston 14, which has smaller spring force, can be adapted to normally press the brake pad 4 first. In this case, a pad contacting position, which will be a basis for control, can be easily detected according to position of the piston(s).

Next, a third embodiment of the present invention will be described with reference to FIG. 5. Here, any components identical with or corresponding to those of the aforementioned first and second embodiments are denoted by the same reference numerals, and a detailed description thereof will be omitted below.

Figure 5:
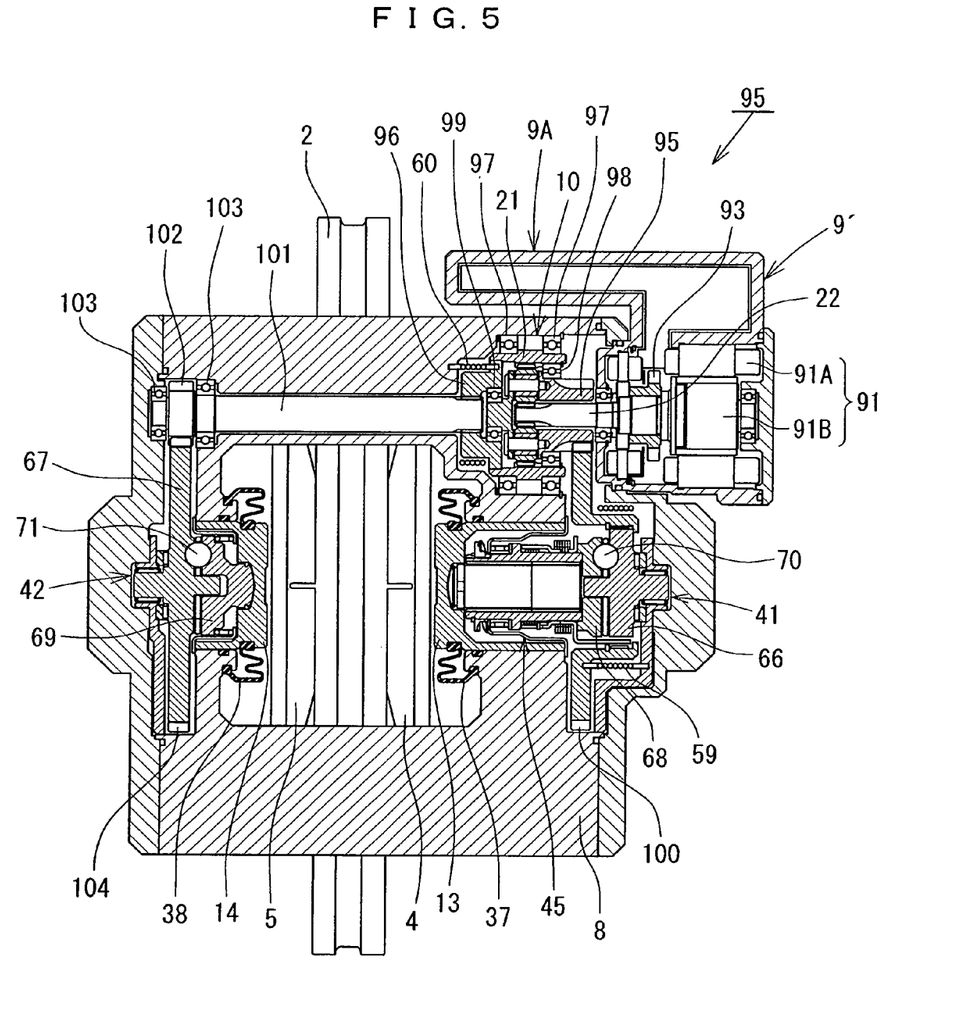
FIG. 5 is a longitudinal section of an electric disk brake according to a third embodiment of the present invention.

Referring to FIG. 5, in an electric disk brake 94 in the third embodiment, the caliper main body 8 is provided so as to sandwich the disk rotor 2. On one side of the caliper main body 8, the piston 13 is arranged so as to face the brake pad 4 while on the other side of the caliper main body 8, the other piston 14 is arranged so as to face the brake pad 5. The piston 13 is connected with the ball-ramp mechanism 41 through the pad wear follow-up mechanism 45. On the other hand, the piston 14 is directly connected with the ball-ramp mechanism 42. Further, on a lateral portion of the piston 13, the motor unit 9' and the reduction mechanism 10 are arranged.

The reduction mechanism 10 comprises: as the same with the first embodiment, the sun gear 18, the planetary gear 19, the planetary carrier 20 and the ring gear 21. Further, a cylindrical first output gear 95 connected with the planetary carrier 20 is extended from one end side of the reduction mechanism 10 while a cylindrical second output member 96 connected with the ring gear 21 is extended from the other end side of the reduction mechanism 10. The ring gear 21 is rotatably supported in the caliper main body 8 by means of a bearing 97. The first output gear 95 and the ring gear 21 are rotatably supported to each other by means of a bearing 98. Further, the planetary carrier 20 and the second output member 96 are rotatably supported to each other by means of a bearing 99. The output shaft 22 of the motor unit 9' is inserted into the first output gear 95, and the sun gear 18 formed on the tip of the output shaft 22 is engaged with the planetary gear 19.

The first output gear 95 is engaged with a major diameter spur gear 100 mounted on an external circumference of the rotation disk 66 of the ball-ramp mechanism 41. Between the spur gear 100 and the caliper main body 8, the coil return spring 59 is connected. By spring force of the return spring 59, the rotation disk 66 is normally urged toward an initial position thereof with a predetermined set torque.

One end side of an intermediate shaft 101 is spline-connected with the second output member 96 of the reduction mechanism 10. The other end side of the intermediate shaft 101 is extended to a side portion of the rotation disk 67 of the ball-ramp mechanism 42, the other end side of the intermediate shaft 101 overpassing the disk rotor 2. Tip of the other end side of the intermediate shaft 101 is provided with the second output gear 102 (spur gear). The intermediate shaft 101 is rotatably supported in the caliper main body 8 by means of a bearing 103. The second output gear 102 is engaged with a major diameter spur gear 104 integrally formed at an outer circumference of the rotation disk 67. Between the second output member 96 and the caliper main body 8, the coil return spring 60 is connected. By applying spring force of the return spring 60 to the second output member 96, the rotation disk 67 is normally urged to its initial position with a predetermined set torque.

Effect achieved by the third embodiment of the present invention discussed hereinabove will be next explained. In braking, according to a brake operation of a driver, etc., control current is supplied from a vehicle controller (not shown) to the motor unit 9', whereby the output shaft 22 of the electric motor 91 is rotated with given torque at a predetermined angle according to the brake operation. Accordingly, the sun gear 18 rotates so as to make the planetary pinion 19 rotated and revolved, whereby the ring gear 21 and the planetary carrier 20 are decelerated in a predetermined speed reducing ratio, performing a differential rotation. Then, the first output gear 95 connected with the planetary carrier 20 will rotate the spur gear 100 engaged with the first output gear 95, so that the rotation disk 66 of the ball-ramp mechanism 41 will be rotated. Accordingly, the linear-motion disk 68 is moved in its axial direction so as to advance the piston 13 through the pad wear follow-up mechanism 45 to press the brake pad 4 toward the disk rotor 2. The second output gear 102 connected to the ring gear 21 through the second output member 96 and the intermediate shaft 101 rotates the spur gear 104 engaged with the second output gear 102, whereby the rotation disk 67 of the ball-ramp mechanism 42 is then rotated. Accordingly, the linear-motion disk 69 is moved in its axial direction so as to advance the piston 14 to directly press the brake pad 5 toward the disk rotor 2.

As discussed hereinabove, the brake pads 4, 5 are pressed from both sides of the disk rotor 2 thereby generating braking force. Accordingly, stroke of the linear-motion disks 68, 69 of the ball-ramp mechanisms 41, 42 can be lessened, so that the lead (bevel of the ball grooves) of the ball-ramp mechanisms 41, 42 is minimized contributing to expansion of thrust force.

When braking force is released, the output shaft 22 of the motor unit 9' is rotated in reverse, whereby both of the rotation disks 66, 67 are returned to their initial position by means of spring force of the return springs 59, 60. Accordingly, the pistons 13, 14 recede so as to separate the brake pads 4, 5 from the disk rotor 2. Since the brake pads 4, 5 placed both sides of the disk rotor 2 are receded, generation of drag can be prevented.

Further, for wear of the brake pads 4, 5, as the same with the second embodiment discussed above, the piston 13 is advanced relative to the linear-motion disk 68 by means of the pad wear follow-up mechanism 45 thereby being able to adjust pad clearance to be constant. Here, in the third embodiment, the pad wear follow-up mechanism 45 is provided only on the piston 13 side, so that the caliper main body 8 is adapted to move as a caliper floating type for wear of the brake pads 4, 5. However, the pad wear follow-up mechanisms may be provided on both sides of the pistons 13, 14, or instead of the ball-ramp mechanism, the rotary-to-linear conversion mechanism that has substantially large stroke and enables to follow-up wear of the brake pads 4, 5 as the same with the ball screw mechanism of the first embodiment can be applied for achieving a caliper fixed-type structure.

Figure 6:
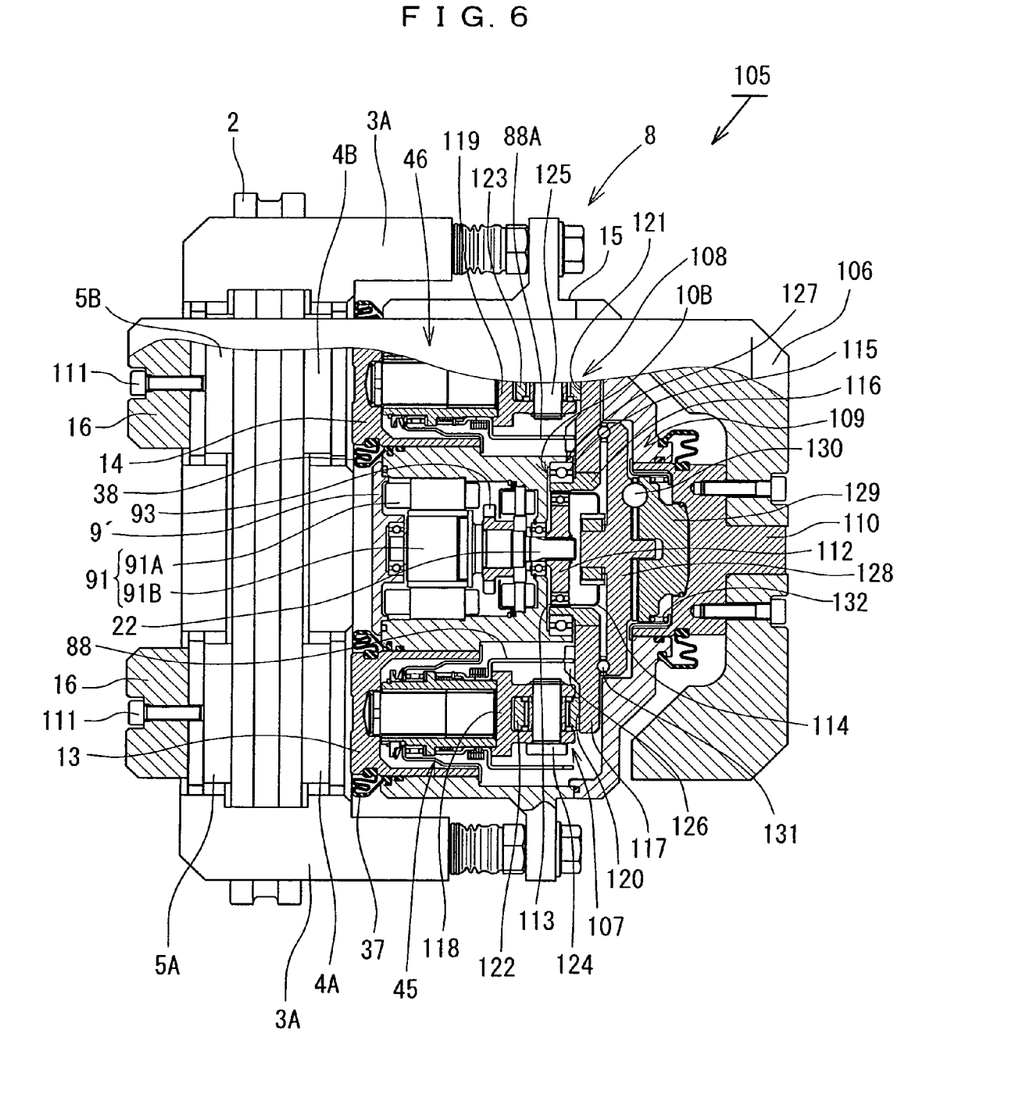
FIG. 6 is a longitudinal section of an electric disk brake according to a fourth embodiment of the present invention.

Next, a forth embodiment of the present invention will be explained with reference to FIG. 6. Here, any components identical with or corresponding to those of the aforementioned second embodiment are denoted by the same reference numerals, and a detailed description thereof will be omitted below.

An electric disk brake 105 according to the fourth embodiment can be categorized into an annette type disk brake. In the caliper main body 8, an approximately C-shaped yoke 106 integrally formed with the claw portion 16 sandwiching the main body portion 15 and the disk rotor 2 is provided as being able to move in the axial direction of the disk rotor 2.

At the center of the main body portion 15 of the caliper main body 8, the motor unit 9' and a wave deceleration mechanism 10B (deceleration mechanism) are arranged. On both sides of the motor unit 9' and the wave deceleration mechanism 10B, a pair of cam-follower mechanisms 107, 108 is arranged. Further, on a rear side of the wave deceleration mechanism 10B, a ball-ramp mechanism 109 is arranged. Still further, the pad wear follow-up mechanisms 45, 46 are interposed between the pair of cam-follower mechanisms 107, 108 and the pistons 13, 14 while the piston 110 is interposed between the ball-ramp mechanism 109 and the yoke 106. The brake pads 4, 5 are divided into two pieces in a circumferential direction of the disk rotor 2. Accordingly, the pistons 13, 14 are each arranged so as to face the brake pads 4A, 4B on one side of the disk rotor 2 while the brake pads 5A, 5B are mounted on the crotched claw portion 16 by means of a pin 111.

The wave deceleration mechanism 10B comprises: a wave generator 112, an elastic gear 114 (spur gear) and a ring gear 116 (internal gear). The wave generator 112 is formed into an oval shape, and the elastic gear 114 connected with the output shaft 22 of the motor unit 9' is made of a thin metal with flexibility, the elastic gear 114 being rotatably engaged with an outer periphery of the wave generator 112 by means of a bearing 113. The ring gear 116 is rotatably supported relative to the main body portion 15 by means of a bearing 115 mounted on the motor case 90 of the motor unit 9'. The elastic gear 114 is engaged with the ring gear 116 through a pair of extended shafts of the wave generator 112 while a non-extended shaft is placed in which to be separated from the ring gear 116. The elastic gear 114 has fewer teeth than the ring gear 116. When the wave generator 112 is rotated, the elastic gear 114 is elastically deformed so that intermeshing positions with the ring gear 116 are sequentially shifted in a direction opposite to a rotational direction of the wave generator 112. With this architecture, relative to the rotation of the wave generator 112, the elastic gear 114 and the ring gear 116 perform differential rotation each in a reverse direction with a predetermined speed reducing ratio.

The cam-follower mechanisms 107, 108 comprise a cam disk 117 and a pair of roller followers 118, 119. The cam disk 117 is a circular plate and mounted on an outer circumference of the ring gear 116 of the wave deceleration mechanism 10B. The pair of roller followers 118, 119 is arranged each facing to the pair of pistons 13, 14, the pair of roller followers 118, 119 being movable in its axial direction of the pistons 13, 14 within the main body portion 15. The cam disk 117 is formed with cam surfaces 120, 121 (bevel surface) in its circumferential direction, these cum surfaces 120, 121 facing the pair of the roller followers 118, 119. At each one end of the roller followers 118, 119, a pair of rollers 122, 123 being able to roll along the cam surfaces 120, 121 is rotatably supported by means of pins 124, 125 while at each other end of the roller followers 120, 121, is respectively abutted to the pad wear follow-up mechanisms. With this architecture, when the cam disk 117 is rotated, the rollers 122, 123 are rolled over the cam surfaces 120, 121, and the roller followers 118, 119 are advanced so as to press the pistons 13, 14 through the pad wear follow-up mechanisms 45, 46.

In addition, the cam disk 117 is provided with engaging portions 126, 127 into which the levers 88, 88A of the pad wear follow-up mechanisms 45, 46 are inserted with a predetermined play. With this architecture, if the cam disk 117 is rotated beyond a certain limit, its rotation is transferred to the limiter mechanism of the pad wear follow-up mechanisms 45, 46 through the levers 88, 88A.

The ball-ramp mechanism 109, as the same with the second embodiment discussed hereinabove, comprises: a rotation disk 128; a linear-motion disk 129; and a ball 130 inserted into ball grooves. Between the rotation disk 128 and the cam disk 117, a thrust shaft 130 is interposed. The linear-motion disk 129 is normally urged toward the rotation disk 128 by means of a spring 132. The rotation disk 128 is connected with the elastic gear 114 of the wave deceleration mechanism 10B, the rotation disk 128 being integrally rotated with the elastic gear 114. When the rotation disk 128 is rotated, the ball 130 is rotated between the bevel ball grooves whereby the linear-motion disk 129 is moved in its axial direction according to rotational angles to press yoke through the piston 110.

Effect achieved by the embodiment of the present invention discussed above will be next explained. In braking, according to a brake operation of a driver, etc., control current is supplied from a vehicle controller (not shown) to the motor/control unit 9, whereby the output shaft 22 of the electric motor 91 is rotated with given torque at a predetermined angle. In the wave deceleration mechanism 10B, through the rotation of the wave generator 112, the elastic gear 114 is elastically deformed so as to shift intermeshing positions relative to the ring gear 116 making the elastic gear 114 and the ring gear 116 performed with differential rotation in a reverse direction.

Based on the above, the cam disk 117 is rotated along with the ring gear 116, whereby the cam followers 118, 119 are moved so as to advance the pistons 13, 14 through the pad wear follow-up mechanism 45, 46. The pistons 13, 14 then press the brake pads 4A, 4B of one side toward the disk rotor 2. Further, the rotation disk 128 of the ball-ramp mechanism 109 is rotated along with the elastic gear 114, whereby the linear-motion disk 129 is moved in its axial direction so as to advance the piston 110. Accordingly, the piston 110 presses the brake pads 5A, 5B of the other side toward the disk rotor 2 through the yoke 106. As discussed above, braking force can be generated by pressing the brake pads 4A, 4B and 5A, 5B from both sides of the disk rotor 2.

Here, the brake pads 4A, 4B and 5A, 5B are pressed from the both sides of the disk rotor 2 by means of the cam-follower mechanisms 107, 108 and the ball-ramp mechanism 109. Thus, the cam-follower mechanisms 107, 108 and the ball-ramp mechanism 109 need to have minimum strokes, whereby bevel of the ball grooves and the cam surface can be minimized so as to expand thrust force. Further, since reaction force of thrust force generated by the cam-follower mechanisms 107, 108 and the ball-ramp mechanism 109 will be supported by a piece of thrust bearing 131 contributing to supporting rigidity enhancement as well as downsizing and low cost.

When braking force is released, the output shaft 22 of the motor unit 9' is rotated in a reverse direction, whereby the pistons 13, 14 are adapted to recede so as to separate the brake pads 4A, 4B and 5A, 5B from the disk rotor 2. Here, since the brake pads 4A, 4B and 5A, 5B placed on both sides of the disk rotor 2 recede, generation of drag can be prevented.

Moreover, for wear of the brake pads 4A, 4B and 5A, 5B, as the same with the second embodiment, the pistons 13, 14 are advanced relative to the cam-followers 118, 119 by means of the pad wear follow-up mechanisms 45, 46, whereby pad clearance can be adjusted in constant.

According to the first to fourth embodiments, it is possible not to apply one of the rotary-to-linear conversion mechanisms, and by fixing one output portion of the reduction mechanism to the caliper main body, only a piece of the rotary-to-linear conversion mechanism can be functioned to generate braking force. Since the above modification can be easily made, the present invention is applicable for general purposes.

What is claimed is:

1. An electric disk brake comprising:
a single electric motor;
a pair of rotary-to-linear conversion mechanisms to which rotation of the electric motor is transferred;
a pressing member that presses at least one brake pad toward a disk rotor by means of each of the rotary-to-linear conversion mechanisms; and
a reduction mechanism interposed between the electric motor and the pair of rotary-to-linear conversion mechanisms,
wherein the reduction mechanism transfers a rotary output, where input of the electric motor is increased, to one side of the pair of rotary-to-linear conversion mechanisms, and transfers reaction force of the rotary output to the other side of the pair of rotary-to-linear conversion mechanisms and
wherein the reduction mechanism comprises: an input portion into which the rotation of the electric motor is inputted; a first output portion that the rotary output is transferred to one side of the pair of rotary-to-linear conversion mechanisms; and a second output portion that reaction force of the rotary output is transferred to the other side of the pair of rotary-to-linear conversion mechanisms, the input portion, the first output portion and the second output portion being arrange in a concentric manner.

2. The electric disk brake according to claim 1, wherein the reduction mechanism provides different torque, which is transferred to each of the pair of rotary-to-linear conversion mechanisms.

3. The electric disk brake according to claim 2, wherein an output adjusting means is provided so as to equalize force that is transferred from the pair of rotary-to-linear conversion mechanisms to the pressing member.

4. The electric disk brake according to claim 3, wherein the output adjusting means is arranged between the reduction mechanism and the rotary-to-linear conversion mechanism.

5. The electric disk brake according to claim 3, wherein the output adjusting means is provided at the rotary-to-linear conversion mechanism.

6. The electric disk brake according to claim 1, wherein the pair of rotary-to-linear conversion mechanisms is arranged in a circumferential direction of the disk rotor.

7. The electronic disk brake according to claim 1, wherein the pair of rotary-to-linear conversion mechanisms is arranged on one side of the disk rotor so as to be placed in the axial direction of the disk rotor.

8. An electric disk brake, comprising:
a single electric motor:
a pair of rotary-to-linear conversion mechanisms to which rotation of the electric motor is transferred:
a pressing member that presses at least one brake pad toward a disk rotor by means of each of the rotary-to-linear conversion mechanisms; and
a reduction mechanism interposed between the electric motor and the pair of rotary-to-linear conversion mechanisms,
wherein the reduction mechanism transfers a rotary output, where input of the electric motor is increased, to one side of the pair of rotary-to-linear conversion mechanisms, and transfers reaction force of the rotary output to the other side of the pair of rotary-to-linear conversion mechanisms and
wherein each of the pair of rotary-to-linear conversion mechanisms is arranged by sandwiching the disk rotor, each of the pair of rotary-to-linear conversion mechanisms facing each other.

9. An electric disk brake comprising:
a single electric motor;
a pair of rotary-to-linear conversion mechanisms to which rotation of the electric motor is transferred;
a pressing member that presses at least one brake pad toward a disk rotor by means of each of the rotary-to-linear conversion mechanisms; and
a reduction mechanism interposed between the electric motor and the pair of rotary-to-linear conversion mechanisms,
wherein the reduction mechanism comprises: an input portion that receives a rotary input from the electric motor; a first output portion that outputs a rotary output where the rotary input of the input portion is increased; and a second output portion that outputs reaction force of difference between the rotary output of the first output portion and the rotary input of the input portion, the first output portion and the second output portion being connected to each of the pair of rotary-to-linear conversion mechanisms and
wherein the input portion, the first output portion and the second output portions are arranged in a concentric manner.

10. The electric disk brake according to claim 9, wherein the first output portion and the second output portion are each rotated in a reverse direction.

11. The electric disk brake according to claim 9, wherein an output adjusting means is provided between the reduction mechanism and the pressing member so as to equalize force transferred from the pair of rotary-to-linear conversion mechanisms to the pressing member.

12. The electric disk brake according to claim 9, wherein the pair of rotary-to-linear conversion mechanisms is arranged in a circumferential direction of the disk rotor.

13. The electronic disk brake according to claim 9, wherein the pair of rotary-to-linear conversion mechanisms is arranged on one side of the disk rotor so as to be placed in the axial direction of the disk rotor.

14. An electric disk brake, comprising:
a single electric motor:
a pair of rotary-to-linear conversion mechanisms to which rotation of the electric motor is transferred:
pressing member that presses at least one brake pad toward a disk rotor by means of each of the rotary-to-linear conversion mechanisms; and a reduction mechanism interposed between the electric motor and the pair of rotary-to-linear conversion mechanisms, wherein the reduction mechanism comprises: an input portion that receives a rotary input from the electric motor: a first output portion that outputs a rotary output where the rotary input of the input portion is increased: and a second output portion that outputs reaction force of difference between the rotary output of the first output portion and the rotary input of the input portion, the first output portion and the second output portion being connected to each of the pair of rotary-to-linear conversion mechanisms and wherein each of the pair of rotary-to-linear conversion mechanisms is arranged by sandwiching the disk rotor, each of the pair of rotary-to-linear conversion mechanisms facing each other.

15. An electric disk brake comprising:

a single electric motor;

a pair of rotary-to-linear conversion mechanisms to which rotation of the electric motor is transferred;

a pressing member that presses at least one brake pad toward a disk rotor by means of each of the rotary-to-linear conversion mechanisms; and a reduction mechanism interposed between the electric motor and the pair of rotary-to-linear conversion mechanisms, wherein the reduction mechanism comprises: an eccentric shaft that is eccentrically rotated by means of the rotation of the electric motor; an external gear that is rotatably supported with the eccentric shaft; and a first internal gear and a second internal gear that each perform differential rotation by engaging with the external gear, the first and second internal gears each transferring their rotation to the pair of rotary-to-linear conversion mechanisms.

16. The electric disk brake according to claim 15, wherein the first internal gear and the second internal gear are arranged in a concentric manner.

17. The electric disk brake according to claim 15, wherein the first internal gear and the second internal gear output different sizes of torque.

* * * * *